J. L. WASHBURNE.
PASTEBOARD BOX OPENER.
APPLICATION FILED MAY 12, 1913.
1,095,251.  Patented May 5, 1914.
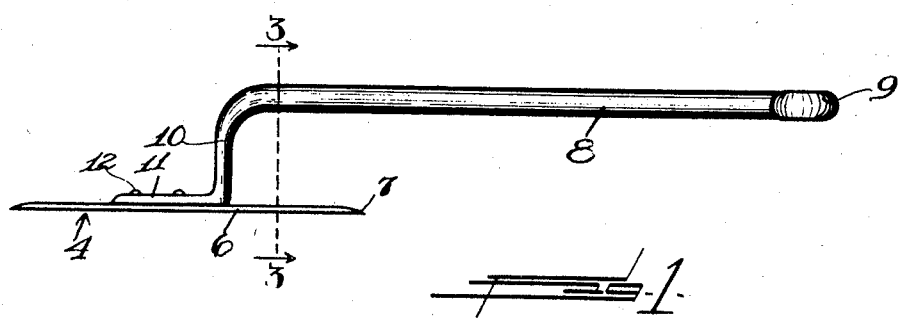
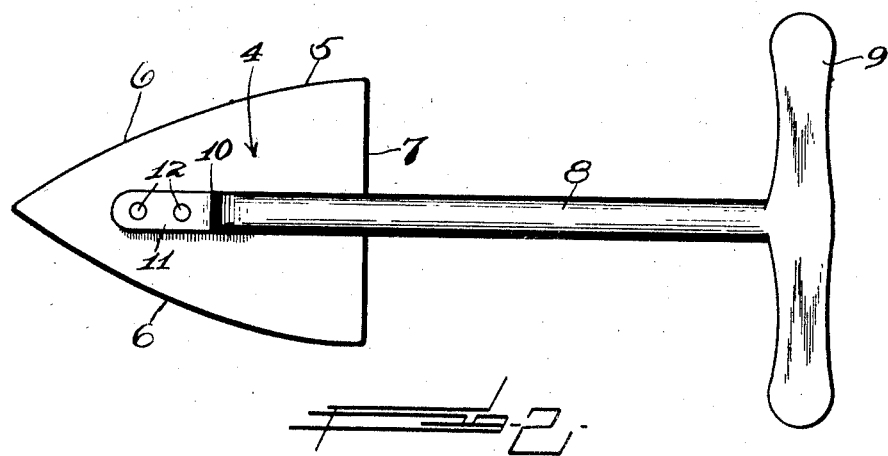
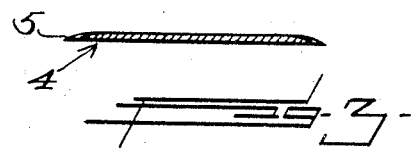
Witnesses
J. M. Lyles.
B. Washburne
Inventor
John L. Washburne,
By C. L. Parker.
Attorneys

UNITED STATES PATENT OFFICE.

JOHN L. WASHBURNE, OF ROCK FALLS, ILLINOIS.

PASTEBOARD-BOX OPENER.

1,095,251.  Specification of Letters Patent.  Patented May 5, 1914.

Application filed May 12, 1913. Serial No. 767,104.

*To all whom it may concern:*

Be it known that I, JOHN L. WASHBURNE, a citizen of the United States, residing at Rock Falls, in the county of Whiteside and State of Illinois, have invented certain new and useful Improvements in Pasteboard-Box Openers, of which the following is a specification.

My invention relates to a device for cutting open, or opening boxes or other receptacles, particularly pasteboard boxes formed of heavy material.

The invention aims to provide means of the above mentioned character, which may be conveniently employed to quickly open pasteboard boxes or the like, the same being capable of use or operation at a great many different angles or positions, is simple in construction, strong, durable and very cheap to manufacture.

Other objects and advantages of this invention will be apparent during the course of the following description.

In the accompanying drawings, forming a part of this specification and in which like numerals are employed to designate like parts throughout the same, Figure 1 is a side view of the device, Fig. 2 is a plan view of the same, and, Fig. 3 is a transverse sectional view taken on line 3—3 of Fig. 1, and looking in the direction of the arrow.

In the drawings, wherein for the purpose of illustration, is shown a preferred embodiment of my invention, the numeral 4 designates a substantially triangular cutting blade, which is flat and is formed relatively thick and rigid. This substantially triangular cutting blade has a continuous cutting edge 5, formed in side and end sections 6 and 7. This continuous cutting edge is formed by beveling the upper surface of the cutting blade 4, adjacent the same, it being understood that the continuous cutting edge is suitably sharp.

The numeral 8 designates a preferably cylindrical straight handle, provided at its outer end with a transverse grip 9. At its inner end the handle 8 is slightly flattened and bent inwardly at substantially a right angle forming an offset portion 10, carrying at its free end an attaching foot 11. This attaching foot is disposed upon the upper surface of the substantially triangular cutting blade 4, arranged centrally thereof, and rigidly connected with the same by means of rivets 12, as shown. I prefer to construct the cutting blade and handle 8 of a suitable grade of steel, which may be plated with nickel. The hand grip 9 is of course formed integral with the handle 8, whereby the device is formed of two main parts, to wit, a cutting blade and a handle portion.

In the use of the device, the hand grip 9 may be held in the hand with the handle 8 passing between the inner fingers, or the same may be held in any other suitable or convenient manner. The pointed end of the substantially triangular cutting blade 4 is then forced into the top or other portion of the pasteboard box for forming a starting opening. After this has been done either of the rear corners or ends of the cutting edge section 7 may be inserted within this starting opening, and by a pulling action, such opening may be enlarged to the desired degree. It is often found convenient and advantageous to insert the cutting blade between the folds of a pasteboard box or pasteboards, in which case the handle 8 is grasped by the operator, its off-set position with relation to the cutting blade 4, affording ample room for the hand.

It is to be understood that the form of my invention herewith shown and described is to be taken as a preferred example of the same, and that various changes in the shape, size and arrangements of parts may be resorted to without departing from the spirit of the invention or the scope of the subjoined claims.

Having described my invention, I claim:—

1. A device for cutting or opening pasteboard boxes or the like, comprising a substantially triangular blade provided with a continuous cutting edge extending entirely thereabout, and a handle connected with one face of the blade and offset laterally therefrom and extending substantially parallel thereto.

2. A device for cutting or opening pasteboard boxes or the like, comprising a substantially triangular blade provided with a continuous cutting edge extending entirely thereabout, and a handle substantially parallel with the blade and connected with the same by an angularly bent portion thereof which is attached to approximately the central portion of one face of the blade to leave all portions of the cutting edge free for action, the angularly bent portion serving as a fulcrum in using the blade for cutting the material of the boxes or the like.

In testimony whereof I affix my signature in presence of two witnesses.

JOHN L. WASHBURNE.

Witnesses:
 J. A. KADEL,
 K. D. ANDREWS.